INVENTOR
KENNETH D. SCHREYER
BY
Prangley, Baird, Clayton, Miller & Vogel
ATTYS.

Jan. 12, 1971  K. D. SCHREYER  3,554,624
LOAD BEARING END PANEL CONSTRUCTION
Original Filed Oct. 23, 1965  8 Sheets-Sheet 4

Jan. 12, 1971   K. D. SCHREYER   3,554,624
LOAD BEARING END PANEL CONSTRUCTION
Original Filed Oct. 23, 1965   8 Sheets-Sheet 6

Jan. 12, 1971  K. D. SCHREYER  3,554,624
LOAD BEARING END PANEL CONSTRUCTION
Original Filed Oct. 23, 1965  8 Sheets-Sheet 8

United States Patent Office 3,554,624
Patented Jan. 12, 1971

3,554,624
LOAD BEARING END PANEL CONSTRUCTION
Kenneth D. Schreyer, Doylestown, Pa., assignor to Lyon Metal Products, Incorporated, Aurora, Ill., a corporation of Illinois
Application Apr. 5, 1967, Ser. No. 635,939, which is a division of application Ser. No. 503,157, Oct. 23, 1965, now Patent No. 3,363,955, dated Jan. 16, 1968. Divided and this application Jan. 17, 1969, Ser. No. 835,824
Int. Cl. A47b 96/20
U.S. Cl. 312—194                    11 Claims

ABSTRACT OF THE DISCLOSURE

The present invention is directed to a load bearing end panel comprising a pair of spaced apart and substantially parallel sheet metal side walls, a pair of sheet metal end walls interconnecting the side walls at the opposite ends thereof and a bottom wall interconnecting the side walls at the bottoms thereof, a body of rigid cellular construction disposed between the side walls and extending between the end walls and substantially filling the space therebetween, layers of adhesive disposed between the inner surfaces of the side walls and the adjacent surface of the body of cellular material for securing the side walls to the body of cellular material throughout the entire facing areas thereof, and a pair of mounting channels respectively disposed adjacent to the side walls and extending from adjacent to the bottom wall upwardly and beyond the upper edges of the side walls.

---

This application is a division of the copending application, Ser. No. 635,939, filed Apr. 5, 1967, for Desk Construction now abandoned, which, in turn, is a division of the copending application, Ser. No. 503,157, filed Oct. 23, 1965, for Desk Construction, now Pat. No. 3,363,955.

It is an important object of the invention to provide in a furniture construction of the type set forth an improved end panel of composite construction including a pair of metal side walls receiving therebetween a filler of honeycomb construction secured thereto by mastic to provide a lead bearing member, the end panel also including channels and brackets at the upper end thereof for mounting the end panel on the mounting channels of an associated furniture top of the present invention.

Further features of the invention pertain to the particular arrangement of the parts whereby the above-outlined and additional features thereof are attained.

The invention, both as to its organization and method of construction together with other objects and advantages, will best be understood by reference to the following specification taken in connection with the accompanying drawings, in which:

Referring now to the drawings, and particularly to FIGS. 1 to 4 thereof, there is illustrated a piece of furniture made in accordance with and embodying the principles of the present invention, a lefthand single pedestal desk 100 having been shown for purposes of illustration. The desk 100 includes a desk top 101 at one end of which is disposed a pedestal 150 supported by a pair of legs 500 having associated feet 520, the pedestal 150 having mounted therein a shelf 190, a box drawer 210 and a file drawer 270, the shelf 190 being provided with a pull 190P, the box drawer 210 being provided with a pull 210P and the file drawer 270 being provided with a pull 270P. Mounted on the other end of the desk top 101 is an end panel 450 supported by a pair of legs 550 having associated feet 570, the space between the pedestal 150 and the end panel 450 at the rear of the desk top 101 being closed by a back panel 400; as may be best seen in FIG. 3, the back panel 400 is provided with a pair of wiring openings 415 for the reception of telephone wires and the like. There further is mounted on the desk top 101 a center drawer 380 and a depending front wall or skirt 390, a lock 360 being provided in substantially the center of the front edge of the desk top 101 to lock the several drawers 210, 270 and 380.

Figure 5:
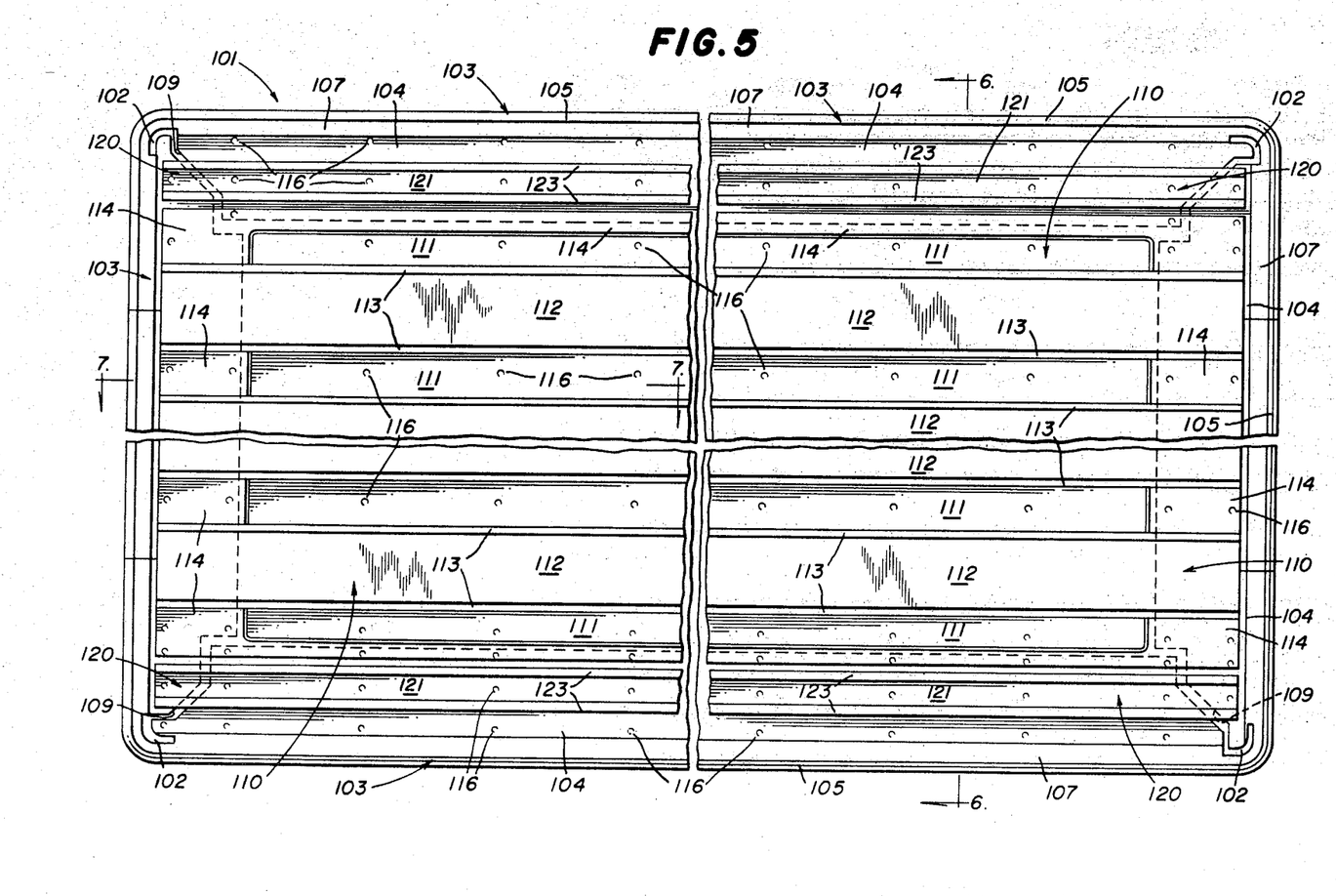
FIG. 5 is a view of the underside of the top of the desk of FIG. 3 substantially as seen in the direction of the arrows along the line 5—5 thereof, certain portions being broken away and the trim and covering thereon removed.
Figure 6:
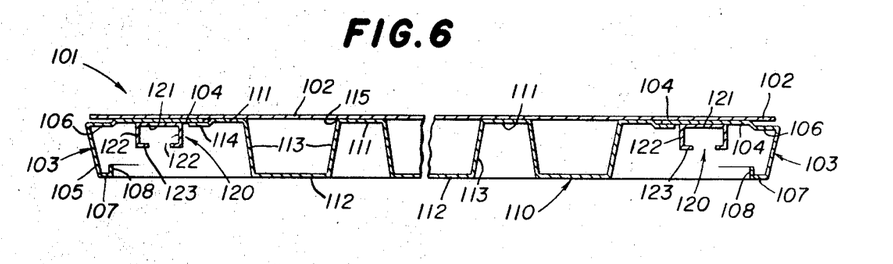
FIG. 6 is an enlarged fragmentary view in vertical section through the desk top of FIG. 5 along the lines 6—6 thereof.
Figure 7:
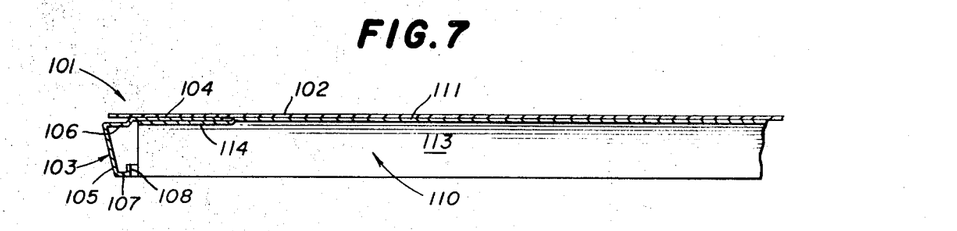
FIG. 7 is an enlarged fragmentary view in vertical section through the desk top of FIG. 5 along the line 7—7 thereof.
Figure 8:
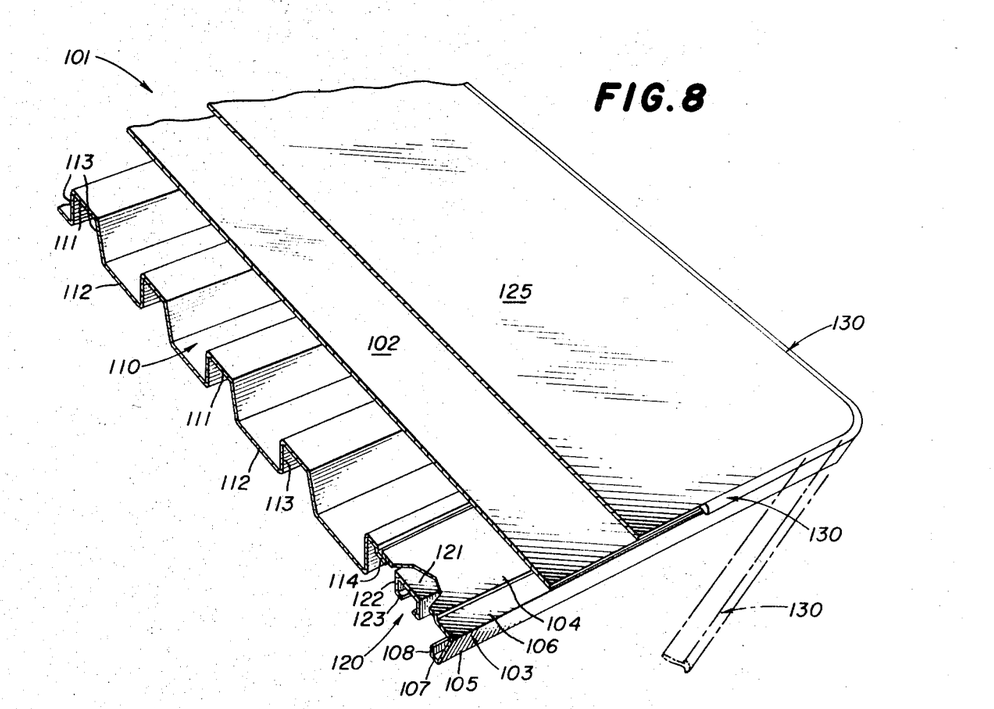
FIG. 8 is a perspective view with certain portions broken away of a corner of the desk top of FIGS. 1 to 4, a portion of the trim being shown in dashed lines in the position thereof immediately prior to installation thereof.

Referring now to FIGS. 5 to 8 of the drawings, additional details of construction of the desk top 101 will be described. As is best seen in FIGS. 6 and 7, the desk top 101 includes a generally flat top plate 102 that is generally rectangular in shape, the corners thereof being rounded, the periphery of the top plate 102 being essentially the same as the periphery of the desk top 101. Disposed beneath the top plate 102 and extending around the periphery thereof is an edging 103 also formed of sheet metal, a substantially flat piece of sheet metal having been deformed to provide an attachment flange 104, a side flange 105, a mounting flange 106, a bottom flange 107 and an upturned flange 108. More specifically, the attachment flange 104 is disposed against the underside of the top plate 102 but is spaced inwardly with respect to the outer edge thereof, the outer edge of the attachment flange 104 carrying thereon the mounting flange 106 which is offset downwardly away from the underside of the top plate 102 and extends outwardly slightly beyond the outer edge thereof. As illustrated, the side flange 105 is integral with the mounting flange 106 and depends therefrom and extends slightly inwardly toward the center of the top plate 102, the flange 105 making an angle of for example 75° with respect to the mounting flange 106. The bottom flange 107 is disposed on the lower edge of the side flange 105 and extends inwardly substantially parallel to the flanges 104 and 106 and carries on the inner end thereof the upturned flange 108 that extends upwardly toward the top plate 102 and is disposed substantially normal thereto and to the bottom flange 107. Preferably the edging 103 is formed of two pieces secured to the top plate 102 by welding at the attachment flange 104 and the abutting edges of the edging 103 located substantially at the midpoints of the shorter top sides are also welded to form seams therebetween. By reference to FIG. 5 it will be seen that the attachment flange 104 is cut out as at 109 at the corners of the table top 101 to permit bending of the remaining portions thereof without providing overlapping of the attachment flanges 104.

Also disposed on the underside of the top plate 102 is a reinforcing sheet 110 formed from a substantially flat piece of sheet metal bent to provide attachment portions 111, ribs 112 having side walls 113, and connecting portions 114 at the periphery thereof. The attachment portions 111 are disposed toward the underside of the top plate 102, there being a body of mastic 115 applied therebetween, the preferred mastic being a heat curing mastic sold under the trademark "Prestite No. 719." The attachment portions 111 are further connected to the top plate 102 by welding as at 116, the heat from the welding operation curing the mastic whereby both the mastic 115 and the weld 116 serve to interconnect the attachment portions 111 and the top plate 102 to provide a firm connection therebetween, the mastic also serving to deaden sound transmission therebetween. The side walls 113 depend downwardly from the attachment portion 111 to form the ribs 112 which are spaced from the underside of the top plate 102. The connecting portions 114 are offset from the underside of the top plate 102 to accommodate therebetween portions such as the attachment flange 104 on the edging 103, the three layers mentioned being connected as by welding at 116.

Also mounted beneath the top 101 are two longitudinally extending and substantially parallel and spaced apart mounting channels 120, each mounting channel 120 including a longitudinally extending main wall 121 and a pair of depending side flanges 122 carrying on the lower ends thereof respectively inturned holding flanges 123. As will be explained in detail hereinafter, all of the other parts of the desk 100 are mounted upon the desk top 101 by means of the mounting channels 120.

Disposed on the upper surface of the top plate 102 is a covering 125, preferably formed of a synthetic organic resin, the preferred materials being those sold under the trademarks "Textolite," "Micarta" and "Formica." An adhesive is applied both to the upper surface of the top plate 102 and to the lower surface of the covering 125 to provide a good bond therebetween, the preferred adhesive being a synthetic rubber resin adhesive of the contact type such as that sold under the trademark "D-500" by the Armstrong Cork Co., the two parts being oven heated to about 200° F. to drive off the volatile ingredients in the adhesive. To complete the desk top 101, a decorative trim 130 is provided therearound.

Referring to FIGS. 9 to 15 of the drawings, there are illustrated the details of construction and mounting of the back panel 400, the back panel 400 being disposed toward the rear of the desk top 101 and disposed immediately below the rear mounting channel 120 thereon and extending between the pedestal 150 and the end panel 450. As may be best seen in FIG. 10, the back panel 400 includes a pair of substantially rectangular side walls 401 formed of sheet metal and disposed substantially parallel to each other, the ends of the side walls 401 being enclosed by end walls 402 and the bottom edges of the side walls 401 being provided with bottom flanges 403 that overlap and are suitably secured together as by welding. The inner side wall 401, i.e., the side wall disposed to the left in FIG. 10, has a rearwardly directed upper flange 404 integral with the upper edge thereof and extending rearwardly toward the outer side wall 401 and terminating adjacent thereto (see FIG. 11 also). The outer side wall 401, i.e., the side wall 401 disposed to the right in FIG. 10, extends upwardly beyond the upper flange 404 and has integral with the upper edge thereof a forwardly directed top flange 405 that overlies and is spaced from the upper flange 404 and in the mounted position is disposed substantially in alignment with the bottom flange 107 on the desk top 101. Disposed between the side walls 401 and the end walls 402 is a filler 410 of cellular construction and formed of a paper product including a pair of outer layers adhesively secured to an inner body of honeycomb construction, the filler 410 being secured by bodies of mastic 411 disposed between the outer surfaces thereof and the inner surface of the side walls 401, thereby fixedly to mount the filler 410 in the back panel 400. By reference to FIGS. 9 and 10 it will be seen that the filler 410 extends from a point spaced slightly above the bottom flanges 403 upwardly to the upper flange 404.

Figure 1:
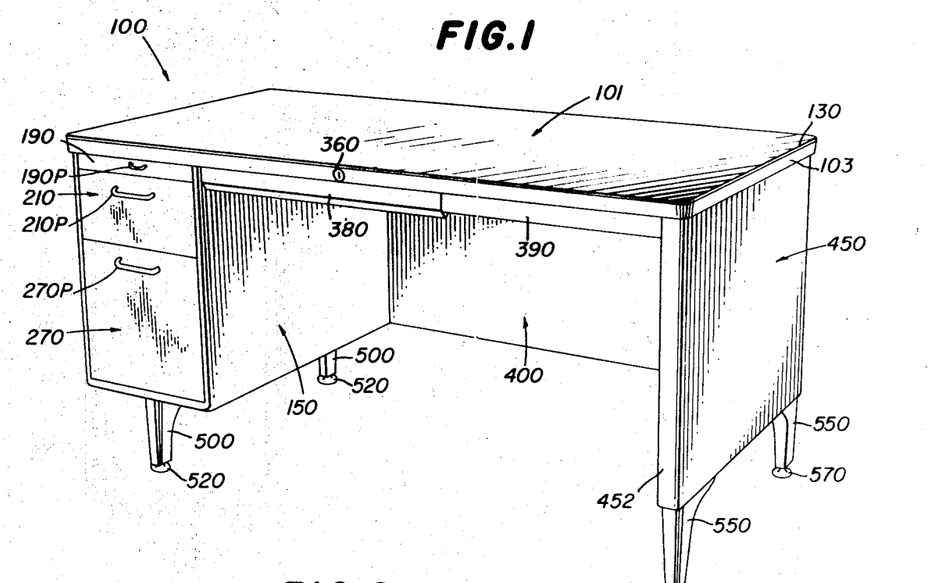
FIG. 1 is a perspective view of a single pedestal desk made in accordance with and embodying the principles of the present invention.
Figure 2:
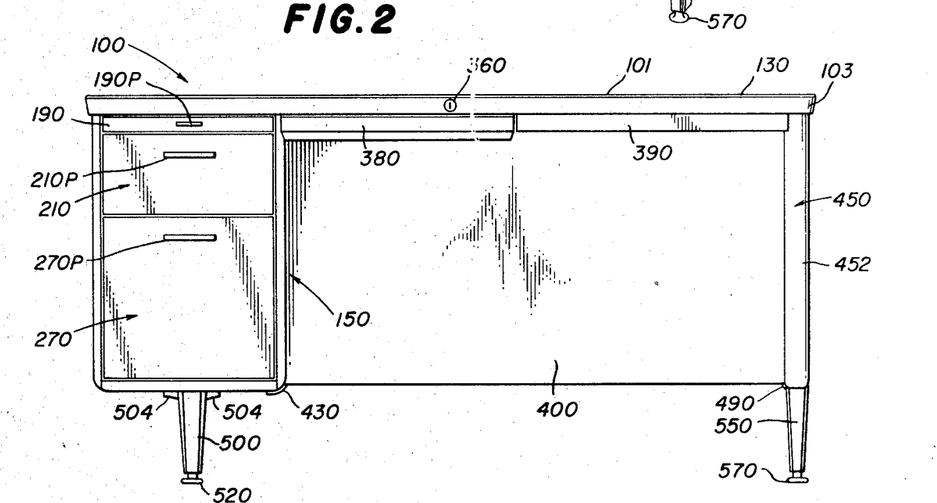
FIG. 2 is a front elevational view of the desk of FIG. 1.
Figure 3:
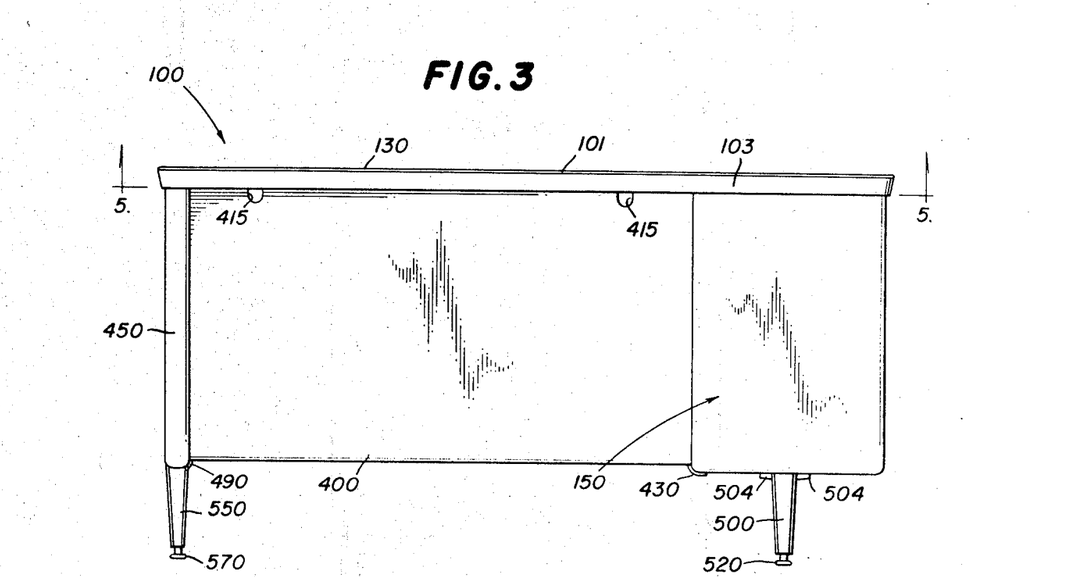
FIG. 3 is a rear elevational view of the desk of FIGS. 1 and 2.
Figure 4:
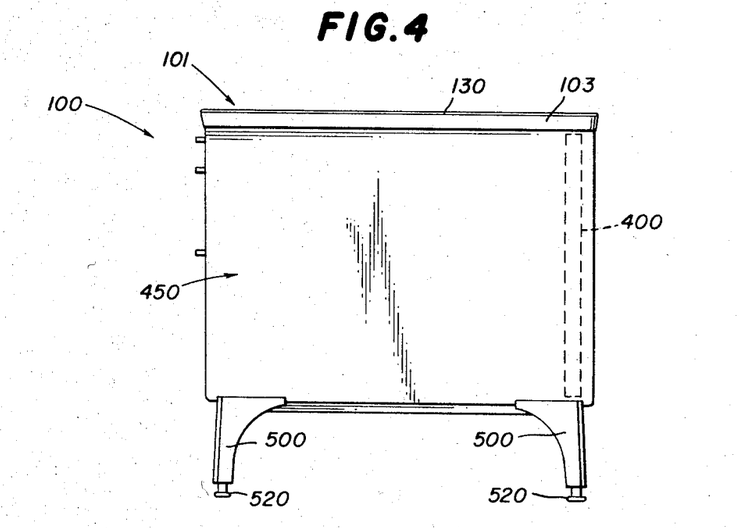
FIG. 4 is an end elevational view of the desk illustrated in FIGS. 1 to 3.

The back panel 400, as are all of the other parts of the desk 100, is mounted upon the desk top 101 and particularly upon the rear mounting channel 120 thereof. To this end a pair of hangers 420 is provided, each of the hangers 420 being mounted on the upper portion of the back panel 400 and spaced a short distance inwardly from the end walls 402 thereof. Each hanger 420 further is in the form of a substantially elongated and vertically arranged body extending into an opening 412 in the filler 410 and upwardly therefrom through aligned slots 406 and 407 in the flanges 404 and 405, respectively, the upper end of the hanger 420 being disposed well above the top flange 405. Integral with the hanger 420 is an attachment flange 421 disposed substantially parallel to the forward side wall 401 and suitably secured thereto as by welding. The upper end of the hanger 420 has a cutout 422 therein that serves to define a hook-like portion 423 at the upper end thereof having a support edge 424 on the underside thereof adapted to engage the upper surface of one of the inturned holding flanges 123 on the associated mounting channel 120. The upper edge of the hook-like portion 423 curves downwardly and forwardly (to the left as viewed in FIGS. 10 and 11) and terminates in a forwardly directed abutment shoulder 425, the abutment shoulder 425 being disposed below the other or forward inturned holding flange 123 on the associated mounting channel 120 and serving to limit movement of the lower end of the back panel 400 in a forward direction. In this manner, the two hangers 420 serve to support the weight of the back panel 400 upon the rear mounting channel 120 and thus upon the desk top 101. Referring to FIG. 3, it will further be seen that the back panel 400 has a pair of wiring openings 415, in the upper edge thereof for receiving telephone wires and the like therethrough.

Figure 9:
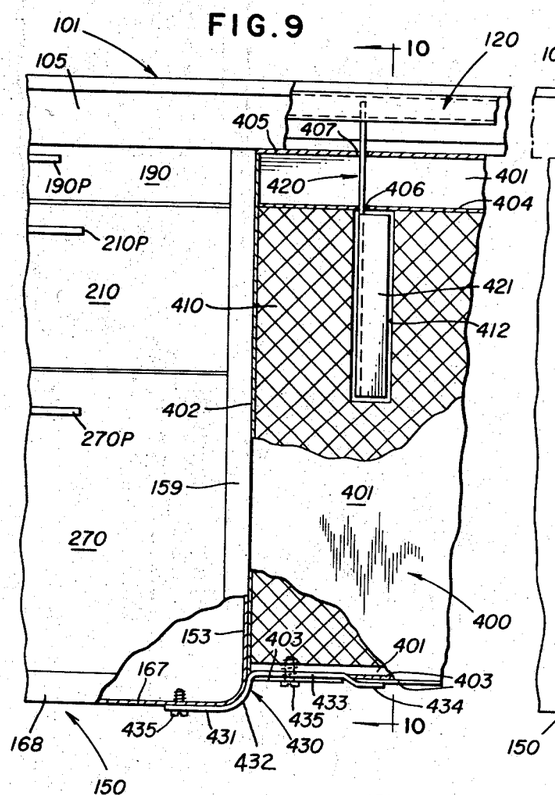
FIG. 9 is an enlarged fragmentary view with certain portions broken away illustrating the construction of the back panel and the connection thereof to the desk top and the adjacent desk pedestal.
Figure 10:
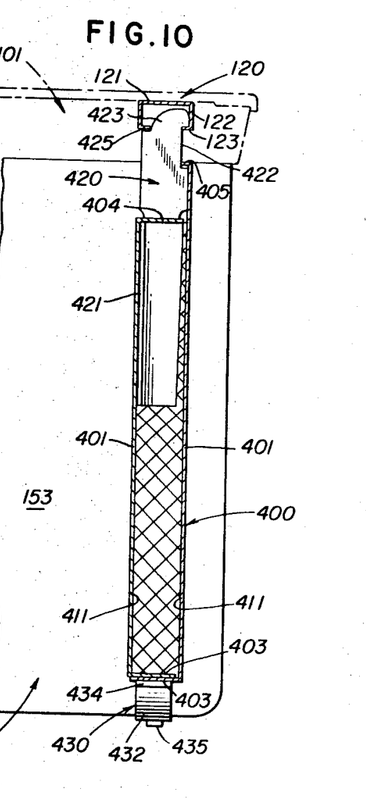
FIG. 10 is a view in vertical section along the line 10—10 of FIG. 9.
Figure 11:
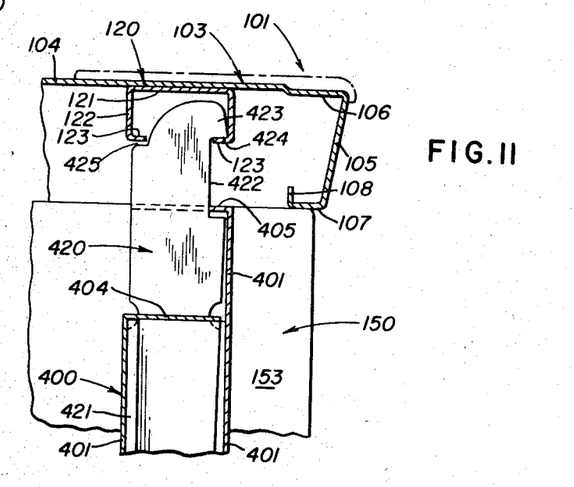
FIG. 11 is an enlarged fragmentary view illustrating the connection between the back panel and the desk top.

In order to secure the lower lefthand corner of the back panel 400 to the adjacent rear portion of the pedestal 150, a clip 430 has been provided. The clip 430 is generally a rectangular strip of metal bent and shaped to provide a pedestal attachment flange 431 which lies against the underside of the pedestal bottom wall 167 and is secured thereto as by a screw 435. Integral with the righthand end of the flange 431 as viewed in FIG. 9 is an upwardly curved portion 432 following the curvature of the pedestal 150 and terminating in a back panel attachment flange 433 disposed substantially parallel to the flange 433, the flange 433 passing through an opening in the bottom flanges 403 of the back panel 400 and resting upon the upper surface of the lowermost bottom flange 403 and secured thereto as by a screw 435. The righthand end of the flange 433 carries thereon an offset flange 434 offset downwardly and disposed substantially parallel to the flanges 431 and 433, the flange 434 extending through a second opening in bottom flanges 403 and lying underneath the lower surface of the lowermost bottom flange 403. In this manner, the lower lefthand corner of the back panel 400 is securely fastened to the rear righthand portion of the pedestal 150.

Figure 12:
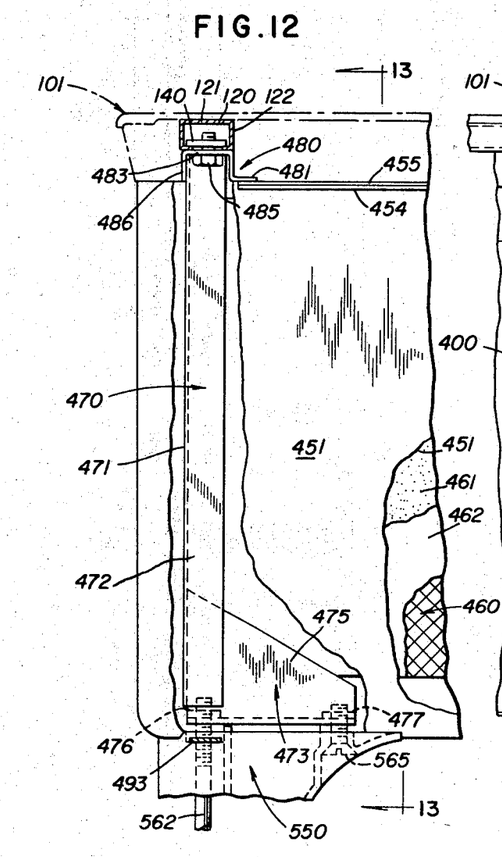
FIG. 12 is an enlarged view with certain portions broken away illustrating the construction of the end panel and the connection thereof to the desk top and to the back panel.
Figure 13:
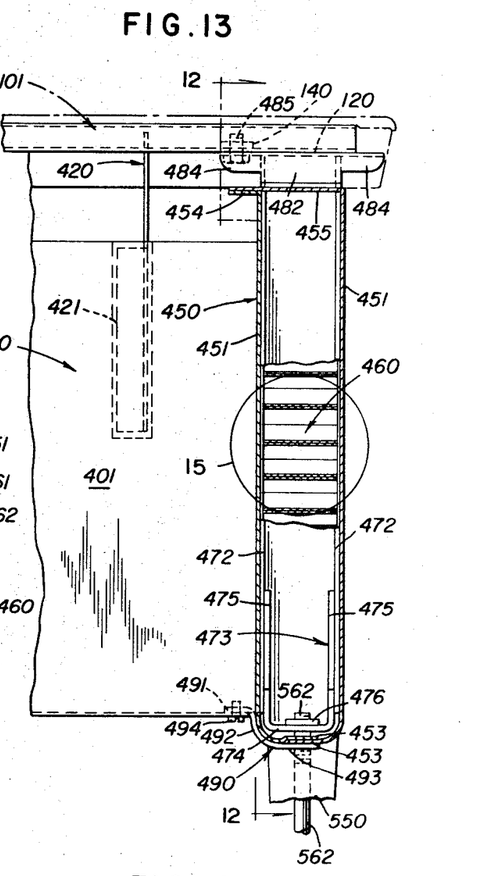
FIG. 13 is a view in vertical section along the line 13—13 in FIG. 12.
Figure 14:
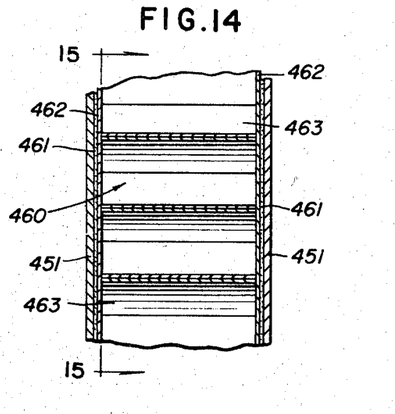
FIGS. 14 and 15 are enlarged views of that portion of FIG. 13 within the circle designated 14 and illustrating the internal construction of the end panel.
Figure 15:
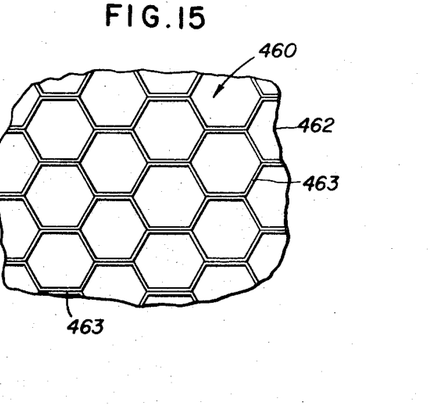
Figure 16:
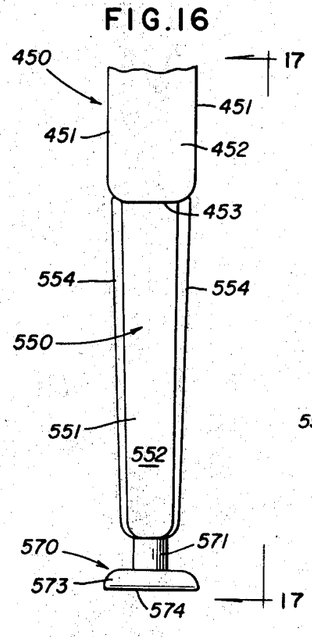
FIG. 16 is an enlarged view of the lower end of the end panel and showing the associated log mounted thereon.
Figure 17:
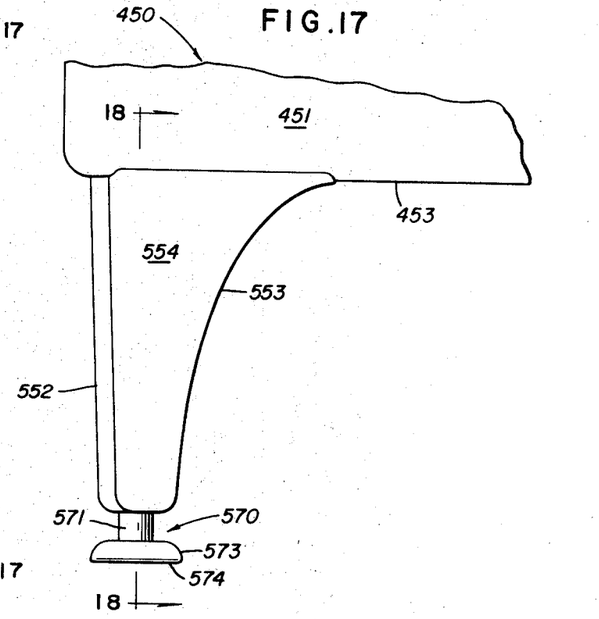
FIG. 17 is a side elevational view of the structure of FIG. 16 as seen in the direction of the arrows along the line 17—17 thereof.
Figure 18:
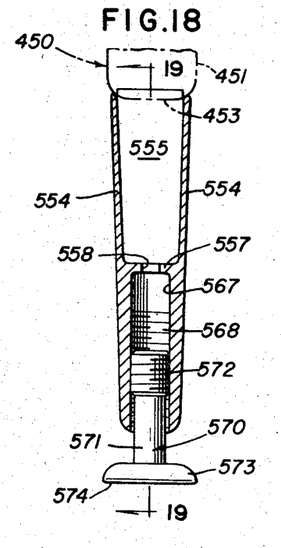
FIG. 18 is a view in vertical section through the leg of FIG. 17 along the line 18—18 thereof.
Figure 19:
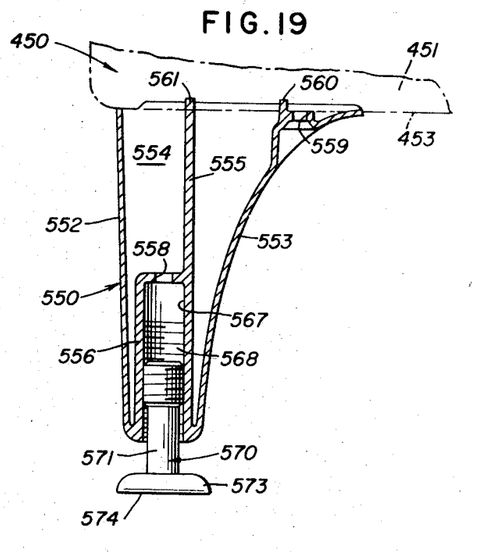
FIG. 19 is a view in vertical section through the leg of FIG. 18 along the line 19—19 thereof.
Figures 20, 21, 22, 23:
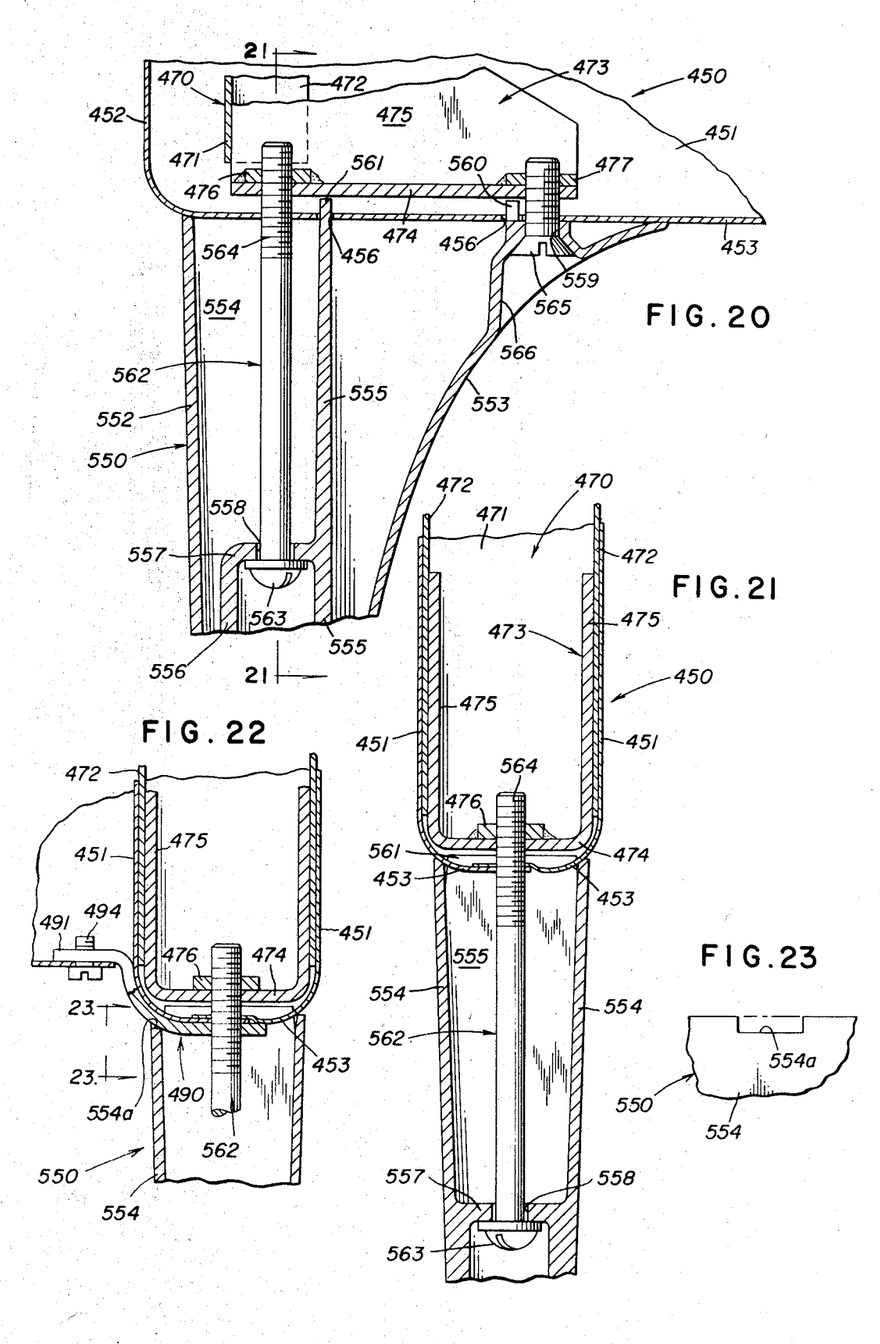
FIG. 20 is a further enlarged view in vertical section with certain portions broken away and illustrating the interconnection between the leg and the pedestal of FIG. 16 at the front of the desk.
FIG. 21 is a view in vertical section through the assembly of FIG. 20 along the line 21—21 thereof.
FIG. 22 is a view similar to FIG. 21 illustrating the connection between the back panel and the end panel and the associated legs.
FIG. 23 is a further enlarged view of the upper end of the leg prior to assembly in FIG. 22.

Disposed at the righthand end of the desk 100 is the end panel 450, the construction and connection thereof being best illustrated in FIGS. 12 to 14 of the drawings. The end panel 450 more specifically is disposed adjacent to the righthand edge of the desk top 101 and extends from a point substantially at the lower edge of the front edging 103 rearwardly to a point immediately below the lower edge of the back edging 103 and actually beyond the rear surface of the back panel 400 (see FIGS. 1 to 4 also). As may be best seen in FIG. 13, the end panel 450 includes a pair of substantially rectangular side walls 451 formed of sheet metal and disposed substantially parallel to each other, the ends of the side walls 451 being enclosed by end walls 452 and the bottom edges of the side walls 451 being provided with bottom flanges 453 that overlap and are suitably secured together as by welding. The inner side wall 451, i.e., the side wall disposed to the left in FIG. 13, has a rearwardly directed upper flange 454 integral with the upper edge thereof and extending inwardly toward the pedestal 150. The outer side wall 451, i.e., the side wall 451 disposed to the right in FIG. 13, extends upwardly slightly beyond the upper flange 454 and has integral with the upper edge thereof an inwardly directed top flange 455 that overlies and bears against the upper flange 454 and is suitably secured thereto as by welding, the longitudinal extent of the flanges 454 and 455 being less than the longitudinal extent of the end panel 450, the flanges 454 and 455 terminating at the inner surfaces of the desk top mounting channels 120 as may be best seen in FIG. 12. Disposed between the side walls 451 and the end walls 452 is a filler 460 of cellular construction and formed of a paper product including a pair of outer layers 462 (see FIG. 14) and adhesively secured to an inner body 463 of honeycomb construction and more specifically formed by suitably bent strips of paper having adjacent surfaces glued together as is best illustrated in FIG. 15. The filler 460 is further secured by bodies of mastic 461 to the inner surfaces of the end panel side walls 451 throughout substantially the entire adjacent area thereof, whereby to form a strong yet lightweight structure that has good sound deadening properties. The mastic 461 is preferably a heavy bodied, short, water dispersed asphalt adhesive such as that sold under the trademark "W-870" by Armstrong Cork Co. or "EC-321" by Minnesota Mining & Mfg. Co. Mounted in each end of the end panel 450 is a generally vertically arranged channel 470 having the lower end thereof spaced upwardly from the lower end of the end panel 450 and extending upwardly beyond the upper end of the end panel 450 as is best seen in FIG. 12, the channel 470 including a main wall 471 and a pair of side flanges 472 integral therewith and disposed parallel to each other, whereby to provide a channel that is essentially U-shaped in cross section. The side flanges 472 are suitably secured as by welding to the inner surfaces of the side walls 451, is being seen from FIG. 13 that the channel 470 extends completely between the side walls 451. There further is disposed within the lower portion of the end panel 450 and adjacent to the lower end of each of the channels 470 a leg support 473 including a bottom wall 474 from which extend upwardly a pair of parallel side walls 475, the upper edges of the side walls 475 sloping downwardly from the associated channel 470 as may be best seen in FIG. 12. The side walls 475 are disposed within the side flanges 472 of the adjacent channel 470 and are suitably secured thereto as by welding. There further are provided in the bottom wall 474 two openings and in alignment with each of the openings is an internally threaded nut, two welded nuts 476 and 477 having been provided as illustrated for the mounting of the associated leg 550 thereon as will be described more fully hereinafter. At the upper end of each of the channels 470 there is provided an anchor clip 480 formed of a single sheet of metal shaped to provide the several parts thereof including an attachment flange 481 resting upon the upper surface of the top flange 455 and suitably secured thereto as by welding. Extending upwardly from the attachment 480 is an upstanding flange 482 that carries on the upper edge thereof an outwardly directed mounting flange 483, both the upstanding flange 482 and the mounting flange 483 having wings 484 extending laterally therefrom and provided in the mounting flange 483 with fastener receiving openings therein to receive bolts 485 for engagement with nuts 140 in the associated mounting channel 120. Further, the mounting flange 483 has on the outer edge thereof a downturned flange 486 that is suitably secured as by welding to the main wall 471 of the associated upstanding channel 470, whereby the anchor clip 430 is fixedly secured both to the channel 470 and the side walls 451.

There further is provided between the lower rear corner of the end panel 450 and the adjacent lower corner of the bottom panel 400 a clip 490 interconnecting the two panels, the clip 490 being formed of a strip of metal bent to provide a back panel attachment flange 491 having integral therewith a curved portion 492 terminating in an end panel attachment flange 493. The back panel attachment flange 491 extends into an opening in the lower wall of the back panel 400 and is secured thereto by means of a screw 494. The end panel attachment flange 493 likewise has an opening therein that receives therethrough a screw (to be described later) that connects the flange 493 to the back flanges 453.

The end panel 450 is supported by two end panel legs 550, one of the legs 550 being disposed toward the forward end of the end panel 450 and the other leg 550 being disposed toward the rear end of the end panel 450, both of the legs being centered laterally under the end panel 450. The details of construction and connection of the end panel legs 550 are best illustrated in FIGS. 16 to 23 of the drawings wherein it will be seen that each of the legs 550 includes a body 551 formed of metal, preferably cast aluminum. The body 551 includes a transversely curved upstanding front wall 552 that merges with a pair of substantially flat side walls 554 that extend rearwardly with respect to the front wall 552 and are curved upwardly and directed rearwardly as may best be seen in FIG. 17. The side walls 554 are joined by a transversely curved and upwardly and rearwardly curved rear wall 553. There further is provided an intermediate wall 555 extending substantially the entire vertical length of the leg 550 and integrally joining an inner wall 556 cooperating to provide a vertically extending recess 567 therein provided with threads 568 on the lower portions of the wall thereof. Finally, a transverse wall 557 is provided joining the upper end of the wall 556 and an intermediate portion of the intermediate wall 555, the transverse wall 557 having an opening 558 therein that is in general axial alignment with the recess 567 and adapted to receive therethrough a fastener as will be described more fully hereinafter. The rear wall 553 also has a fastener receiving opening 559 therein, there being provided adjacent to the opening 559 an upwardly extending projection 560, a cooperating projection 561 being provided on the upper end of the intermediate wall 555, the projections 560 and 561 extending into cooperating openings or slots 456 in the bottom flange 453 of the end wall 450 (see FIG. 20).

In order to attach each of the legs 550 to the underside of the end wall 450, a first bolt 562 has been provided having an enlarged head 563, the shank of the bolt 562 extending upwardly through the opening 558 in the transverse wall 557 with the head 563 engaging the under surface of the wall 557, the upper end of the bolt 562 carrying a threaded portion 564 that extends upwardly through aligned openings in the clip flange 493 (where provided as in FIG. 22) and the bottom flanges 453 and the bottom wall 474 and threadedly engaging the nut 476. A second bolt 565 is disposed in the recess 566 in the rear wall 553 that is in alignment with the opening 559 therein, the bolt 565 extending through an aligned opening in the bottom flanges 453 and the bottom wall 474 and threadedly engages the nut 477. It will be seen from FIGS. 20 and 21 that the leg 550 is firmly mounted upon the end wall 450 by means of the bolts 562 and 565, the connection being entirely concealed. It further is noted that the upper edges of the front wall 552, the rear wall 553, the side walls 554 and the intermediate wall 555 are all curved to accommodate the curved lower edge of the end panel 450.

The lower end of each of the legs 550 has operatively connected thereto a foot 570, the foot 570 including an elongated vertically arranged shank 571 extending upwardly into the associated recess 567 and having adjacent to the upper end thereof an enlarged threaded section 572 carrying threads that engage the threads 568 in the leg 550. Integral with the lower end of the shank 571 is an enlarged support member 573 of generally circular outline and having a substantially flat support surface 574 on the underside thereof. It will be seen that the foot 570 is adjustable with respect to the leg 550 and possesses all of the advantages that have been set forth above with respect to the leg 500 and its associated foot 520, whereby in the interest of brevity, the same will not be here repeated.

Fundamentally the desk 100 is formed of sheet metal with the exception of the several parts mentioned during the above description. Furthermore, the sheet metal forming the various parts is of relatively light gauge, as will be appreciated from the following examples of the gauge of the sheet metal utilized to form various parts of the desk 100. For example, in a typical illustrative embodiment of the desk top 101, the top plate 102 is formed of 20 gauge steel, the edging 103 is formed of 18 gauge steel, reinforcing sheet 110 is formed of 24 gauge steel and the mounting channel 120 is formed of 18 gauge steel. In a typical construction of the back panel 400, the outer side wall 401 is formed of 24 gauge steel, the inner side wall 401 is formed of 26 gauge steel and the hangers 420 are formed of 14 gauge steel. Similarly, in a typical construction of the end panel 450, both of the side walls 451 are formed of 24 gauge steel, the channel 470 is formed of 16 gauge steel, the anchor clips 480 are formed of 14 gauge steel and the leg support 473 is formed of 12 gauge steel.

The remaining parts of the desk not fully described herein are fully illustrated and described in the co-pending application Ser. No. 503,157, now Pat. No. 3,363,955, and the description thereof is incorporated herein in its entirety by reference.

From the above description it will be seen that there has been provided an improved article of furniture, and specifically an improved desk construction, which fulfills all of the objects and advantages set forth above.

In addition, there has been provided an improved end panel of composite construction including a pair of metal side walls receiving therebetween a filler of honeycomb construction secured thereto by mastic, the end panel also including stiffening channels and brackets at the upper end thereof for mounting of the end panel on the mounting channels of an improved desk top and for connecting to the end panel legs.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A load bearing end panel comprising a pair of spaced apart and substantially parallel sheet metal side walls, a pair of sheet metal end walls interconnecting said side walls at the opposite ends thereof and a bottom wall interconnecting said side walls at the bottoms thereof, a body of rigid cellular construction disposed between said side walls and extending between said end walls and substantially filling the space therebetween, layers of adhesive disposed between the inner surfaces of said side walls and the adjacent surface of said body of cellular material for securing said side walls to said body of cellular material throughout the entire facing areas thereof, and a pair of mounting channels respectively disposed adjacent to said side walls and extending from adjacent to said bottom wall upwardly and beyond the upper edges of said side walls, said mounting channels being welded to said side walls to prevent movement between said channels and said side walls.

2. The end panel set forth in claim 1, wherein each of said side walls has a flange on the upper end thereof extending therefrom in the same direction and overlapping and secured together.

3. The end panel set forth in claim 1, and further comprising a mounting bracket connected to the upper end of each of said mounting channels for mounting said end panel upon an overlying support member.

4. A load bearing end panel comprising a pair of spaced apart and substantially parallel sheet metal side walls, a pair of sheet metal end walls interconnecting said side walls at the opposite ends thereof and a bottom wall interconnecting said side walls at the bottom thereof, a body of rigid cellular construction disposed between said side walls and extending between said end walls and substantially filling the space therebetween, layers of adhesive disposed between the inner surfaces of said side walls and the adjacent surface of said body of cellular material for securing said side walls to said body of cellular material throughout the entire facing areas thereof, a pair of mounting channels respectively disposed adjacent to said side walls and extending from adjacent to said bottom wall upwardly and beyond the upper edges of said side walls, and a pair of U-shaped leg support brackets disposed in the lower portion of said end panel and secured respectively to the lower ends of said mounting channels, said bottom wall and each of said brackets having aligned openings therein for receiving a fastener therethrough to mount a leg on the underside of said end panel.

5. The end panel set forth in claim 4, and further comprising a threaded member on said leg support bracket for threadedly engaging a complementarily threaded fastener therein.

6. A load bearing end panel comprising a pair of spaced apart and substantially parallel sheet metal side walls, a pair of sheet metal end walls interconnecting said side walls at the opposite ends thereof, a pair of U-shaped mounting channels extending from approximately the lower edges of said side walls to beyond the upper edges thereof, each of said channels having a pair of parallel side flanges and a connecting wall integral therewith, the connecting wall of each of said channels being positioned substantially parallel to said end walls, said side flanges of each of said channels being welded to the adjacent ones of the side walls so as to prevent movement of said channels relative to said side walls.

7. The end panel set forth in claim 6, and further comprising a body of rigid cellular construction disposed between said side walls and extending between said end walls and substantially filling the space therebetween, and means for securing said body of cellular material to said body of cellular material to said side walls.

8. The end panel set forth in claim 6, wherein the upper edges of said walls are bent in the same direction to form a pair of overlapping flanges, and further comprising means securing said overlapping flanges together and a pair of anchor clips individually attached to an associated one of said mounting channels and to said overlapping flanges.

9. The end panel set forth in claim 6, wherein the bottom edges of said side walls are bent toward one another to form a pair of overlapping flanges, and further comprising means securing said overlapping flanges together to form a bottom wall for said end panel, and a clip having a first flange attached to said bottom wall and a second flange for connecting the end panel to an adjoining member.

10. A load bearing end panel comprising a pair of spaced apart and substantially parallel sheet metal side walls, a pair of sheet metal end walls interconnecting said side walls at the opposite ends thereof, a pair of U-shaped mounting channels extending from approximately the lower edges of said side walls to beyond the upper edges thereof, each of said channels having a pair of parallel side flanges and a connecting wall integral therewith, the connecting wall of each of said channels being positioned substantially parallel to said end walls, means securing the side flanges of each of said channels to the adjacent ones of the side walls near the associated ones of said end walls, and a pair of U-shaped leg support brackets disposed in the lower portion of said end panel and secured respectively to the lower ends of said mounting panels, said bottom wall and each of said brackets having aligned openings therein for receiving a fastener therethrough to mount a leg on the underside of said end panel.

11. The end panel set forth in claim 10, and further comprising a pair of threaded members each mounted on an associated one of the bottom walls of said leg support brackets and aligned with an opening therein for threadedly engaging a complementarily threaded fastener.

References Cited

UNITED STATES PATENTS

| | | | |
|---|---|---|---|
| 2,911,274 | 11/1959 | Grube | 52—619 |
| 2,943,898 | 5/1960 | Knuth | 108—156 |
| 3,194,188 | 7/1965 | Hamilton et al. | 312—194X |
| 3,343,314 | 9/1967 | Smith | 52—615X |

ROY D. FRAZIER, Assistant Examiner

U.S. Cl. X.R.

52—615

UNITED STATES PATENT OFFICE
CERTIFICATE OF CORRECTION

Patent No. 3,554,624         Dated January 12, 1971

Inventor(s) K. D. Schreyer

It is certified that error appears in the above-identified patent and that said Letters Patent are hereby corrected as shown below:

Col. 1, line 44, "lead" should be - load --.
Col. 2, line 25, "log" should be -- leg --;
       line 41, "legs" should be -- leg --.
Col. 4, line 36, "surface" should be -- surfaces --.
Col. 6, line 4, "is" should be -- it --;
       line 37, "430" should be -- 480 --.
Col. 9, Claim 7, line 11, delete -- said body of
              cellular material to --.

Signed and sealed this 18th day of May 1971.

(SEAL)
Attest:

EDWARD M. FLETCHER, JR.         WILLIAM E. SCHUYLER, J
Attesting Officer               Commissioner of Patent